E. MARTIN.
CARRIER TRACK.
APPLICATION FILED JULY 27, 1914.
1,112,017.
Patented Sept. 29, 1914.
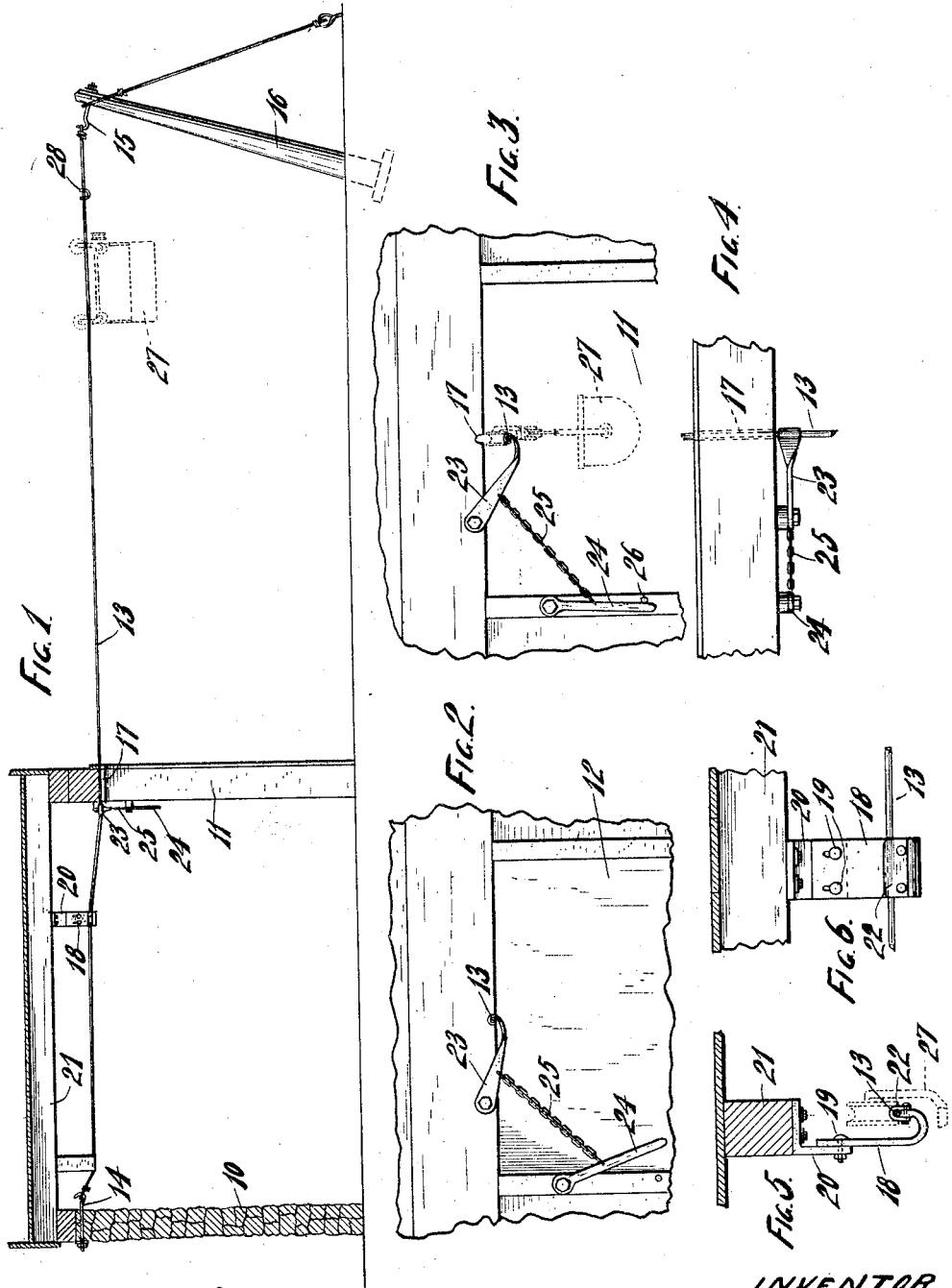
WITNESSES
INVENTOR
Edward Martin,
By R. S. C. Caldwell,
ATTORNEY.

UNITED STATES PATENT OFFICE.

EDWARD MARTIN, OF OCONOMOWOC, WISCONSIN.

CARRIER-TRACK.

1,112,017.  Specification of Letters Patent. Patented Sept. 29, 1914.

Application filed July 27, 1914. Serial No. 853,558.

*To all whom it may concern:*

Be it known that I, EDWARD MARTIN, a citizen of the United States, and resident of Oconomowoc, in the county of Waukesha and State of Wisconsin, have invented new and useful Improvements in Carrier-Tracks, of which the following is a description, reference being had to the accompanying drawings, which are a part of this specification.

This invention has for its object to provide a carrier track particularly designed for use in barns in which the door is low and the track is desired to pass through the doorway to a point distant from the barn where the carrier is to be dumped, and consists in the provision of means for raising and lowering the carrier track at the door so as to allow for clearance of the carrier wheels at times when the carrier is in use and to allow for closing the door when the carrier is not in use.

Another object of the invention is to avoid the single span connection which has been commonly employed with carrier tracks of this type by providing track hangers within the barn which raise the track above the elevation of the span passing through the doorway, and thereby avoiding the jouncing action of the carrier when being filled.

Another object of the invention is to perfect details of construction of carrier track mechanism.

With the above and other objects in view the invention consists in the carrier tracks as herein claimed and all equivalents.

Referring to the accompanying drawings in which like characters of reference indicate the same parts in the different views: Figure 1 is a side elevation of a carrier track constructed in accordance with this invention; Fig. 2 is a view showing the upper portion of the doorway as seen from within the barn with the door closed; Fig. 3 is a similar view thereof with the door open and the track lowered to its operative position; Fig. 4 is a plan view of the track depressing means; Fig. 5 is an end view of one of the adjustable track hangers; and, Fig. 6 is a side view thereof.

In these drawings 10 indicates a barn structure having a doorway 11 with a door 12, such doorway being of the low type with its upper part lower than the ceiling of the barn. A carrier track consisting of a heavy wire 13 is secured at one end to an anchor bolt 14 passing through the rear wall of the barn and at the other end to an anchor bolt 15 mounted on a suitably stayed post 16 at some distance from the barn, such track wire passing through the doorway 11 and normally lying within a groove 17 at the middle of the doorway in the lower edge of the upper beam of the doorway. Within the barn the track is supported at the desired height, preferably higher than the doorway, by means of adjustable hangers 18 which are of a hook shape to avoid interference with the carrier wheels and which have clamping bolts 19 passing through longitudinal slots thereof into brackets 20 secured to the joists or beams of the ceiling. Preferably the connection of the track wire 13 to the hooked end of the track hanger 18 is made by means of an inverted U-shaped cleat 22 passing over the track wire and bolted to the track hanger, such cleat being rounded at its ends to avoid interference with the passage of the carrier wheels. This clamping support for the carrier track at intervals within the barn relieves the horizontal portion of the track wire between them from the tension or the slack that is given to the span of the track wire which passes through the doorway and consequently such horizontal portion of the track wire remains under a predetermined state of tension whether the barn door is open or closed, and the carriers supported thereon are held firmly against yielding to the weight of the material as it is thrown therein and do not jounce as with carriers suspended from slack wires.

At the doorway is pivotally mounted a track wire depressing lever 23 having a hook-shaped end secured to the track wire and guiding it into the groove 17 when permitted to swing to its upper position as shown in Fig. 2. A handle lever 24 is pivotally mounted at the side of the doorway and is connected by a chain 25 with lever 23 so that when swung by hand from the position shown in Fig. 2 to the position shown in Fig. 3 the lever 23 is swung downwardly to depress the track wire 13 below the upper beam of the doorway a sufficient distance to permit the wheels of the carrier to pass. In this position of the handle lever 24 it may be locked by a pin 26 inserted within an opening in the doorway provided for the purpose. With the barn door open and the track wire depressed, as shown in Fig. 3, the carrier 27, which is shown by dotted lines in said figure and in Fig. 1, is free to pass through the doorway from the horizontal permanently tensioned portion of the track wire within the barn to the inclined temporarily tensioned portion of the track wire outside of the barn where it will be automatically dumped at the point at which the trip 28 has been set and will then return to the doorway of the barn automatically by descending the inclined span of wire. From the doorway the carrier may be forced up the slight incline of the track wire to the horizontal portion thereof for refilling at any desired point within the barn and when the work is finished, or in cold weather when it is desired to close the door during the time the carrier is being refilled, the handle lever 24 is released and swung upwardly to the position shown in Fig. 2, permitting the tension on the track wire 13 to draw it upwardly into the groove 17 out of the way of the door so that the door may be closed. The relief of tension on the span of track wire passing through the doorway does not affect the tension of the horizontal portions of the trackway within the barn and the steady support of the carrier during the filling operation is thereby permitted as described.

The adjustability of the track hangers 18 enables the horizontal portion of the track wire to be raised or lowered as desired to suit the interior arrangement of the barn and it is obviously not necessary that such track wire should be horizontal at all parts of the interior of the barn as it may be desired to have the track higher in some places than in others.

In those barn equipments in which the span of track wire outside of the barn extends in a different direction from the portion of the track wire within the barn leading to the doorway, as when a single post is employed for spans of track wire leading to two doorways, the track wire depressing lever 23 serves the purpose of staying the track wire at the bend or angle thereof and it is preferred to arrange the said lever on one side or the other of the track wire according to the direction of the bend in the track wire so that the pull of the track wire thereon will be in a direction away from its pivotal connection and will therefore be resisted by the chain 25.

Obviously any usual tension means may be provided for the span of track wire passing through the doorway and though the clamping connection between the track hanger and the track wire is preferred a connection which permits the tension of the track wire from one end to the other may be substituted without allowing of the degree of jouncing action of the carrier when being filled that was occasioned by the suspension of the carrier on a single span of wire extending from one anchor bolt to the other, the track hangers between the carrier and the doorway not only serving to enable the interior portion of the track to be raised to a greater height than the doorway, but serving to reduce the length of the span of track wire from which the carrier is suspended and therefore reducing the springing action of the carrier.

What I claim as new and desire to secure by Letters Patent is:

1. In a carrier track for barns and the like, a track wire having one end secured within the barn and passing through the doorway with its other end secured at a point outside of the barn, means for depressing the track wire from a position above the level of the top of the barn door to a position below such level, a track hanger within the barn near the doorway engaging the track wire, and a carrier mounted to travel on the track wire from a loading position between the track hanger and the interior secured portion of the track wire through the doorway to a discharging position outside of the barn.

2. A carrier track for barns and the like, comprising a track wire having one end secured within the barn and passing through the doorway with its other end secured at a point outside of the barn, a suitably mounted lever connected with the track wire near the doorway, means for swinging the lever to lower the track wire from a position at the upper edge of the doorway to a position therebeneath, a track hanger engaging the track wire within the barn near the doorway, and a carrier mounted on the track wire and adapted to travel from a loading position between the track hanger and the interior secured end of the track wire through the doorway to a discharging position outside of the barn.

3. A carrier track for barns and the like, comprising a track wire secured within the barn and passing through the doorway thereof to a point outside of the barn, there being a groove in the upper portion of the doorway through which the track wire passes, a lever pivotally mounted at the doorway having a hooked end engaging the track wire, a handle lever pivotally mounted at the doorway, means connecting the handle lever with the hooked lever for swinging the latter to depress the track wire to a position below the groove, and a carrier mounted on the track wire.

4. In a carrier track, a track hanger comprising a bracket, a hook-shaped hanger member adjustably secured thereto, and an inverted U-shaped cleat embracing the upturned hook-shaped end of the hanger member and adapted to surround a track wire.

In testimony whereof, I affix my signature, in presence of two witnesses.

EDWARD MARTIN.

Witnesses:
C. D. PROBERT,
E. C. THEOBALD.

Copies of this patent may be obtained for five cents each, by addressing the "Commissioner of Patents, Washington, D. C."